US005768491A

United States Patent [19]

Lobodzinski et al.

[11] Patent Number: 5,768,491

[45] Date of Patent: Jun. 16, 1998

[54] DISPLAY CONTROLLER WITH ENHANCED VIDEO WINDOW CLIPPING

[75] Inventors: Mark A. Lobodzinski, Houston; Kai-Fat Fong, Missouri City, both of Tex.

[73] Assignee: Compaq Computer Corporation, Houston, Tex.

[21] Appl. No.: 476,099

[22] Filed: Jun. 7, 1995

[51] Int. Cl.$^6$ .................... G06F 3/14

[52] U.S. Cl. .................... 395/134; 395/340; 395/508

[58] Field of Search .................... 395/134, 162, 395/164, 119, 339–345, 508

[56] References Cited

U.S. PATENT DOCUMENTS 5,321,810 6/1994 Case et al. .................... 395/166

5,353,391 10/1994 Cohen et al. .................... 395/125

*Primary Examiner*—Joseph H. Feld

*Assistant Examiner*—Rudolph Buchez

*Attorney, Agent, or Firm*—Vinson & Elkins L.L.P.

[57] ABSTRACT

A computer system includes a display controller which supports video display. The display controller includes circuitry for determining which portions of one or more video windows should be written to the frame buffer responsive to the locations of other screen objects which may overlie the video window on the display. An unused portion of frame buffer memory is used to stored a plurality of transition groups, each group defining which portions of the video window are visible within a range of scanlines. The transition information is used by clipped circuitry to enable or disable writing of video information to the frame buffer.

17 Claims, 6 Drawing Sheets

DISPLAY CONTROLLER WITH ENHANCED VIDEO WINDOW CLIPPING

TECHNICAL FIELD OF THE INVENTION

This invention relates in general to computers and, more particularly, to a display controller with enhanced circuitry for clipping video windows.

BACKGROUND OF THE INVENTION

Multimedia applications present information to a user using a combination of audio, graphics and video. The inclusion of video in multimedia applications is becoming more frequent as computer hardware becomes powerful enough to support the processing demands of video.

The inclusion of video in an application increases demands on the video/graphics controller (hereinafter, the "display controller"). One particular problem associated with the inclusion of one or more video windows in a multimedia application is illustrated in connection with FIG. 1*a*. In FIG. 1*a*, a computer generated display 10 is shown in which a video window 12 is partially obscured by a first overlying window 14 and a second overlying window 16. In this configuration, the video being output to window 12 must be shown only in the non-clipped region, i.e., that region which is not covered by an overlying screen object, such as windows 14 and 16.

A prior art solution to track the visible portion of a video window is shown in FIG. 1*b*. A map of each pixel on the screen is stored in a memory on the graphics card, such as an unused portion of the frame buffer. The memory contains a bit for each pixel on the display 10. Thus, for a display having a resolution of 800×600, the video map 18 would comprise 480,000 bits or approximately 60 KBytes. FIG. 1*b* illustrates a portion of the video map 18 corresponding to the portion of the display denoted by box 19 in FIG. 1*a*.

In operation, a bit having a first state ("0" in the illustrated example), indicates that video should not be displayed for a corresponding pixel. A bit having a second state ("1" in the illustrated example), indicates that the video corresponding to that pixel should be output to the display by writing the corresponding pixel to the frame buffer. The display controller, when outputting video, references the video map 18 prior to writing video information to the frame buffer. For each pixel in the video window, the video information will be written only if the corresponding bit in the video map 18 is in the second state. Otherwise, the frame buffer is not overwritten with the video information.

One problem with the prior art solution is the size of the memory needed to support the video map 18. For a high resolution screen, for example, a 1024×768 display, 786,432 bits or approximately 98 KBytes are needed for each video window. For two video windows, a separate video map is needed for each video window, and hence, a memory of 196 KBytes would be necessary. Since the display controller often needs a large portion of the frame buffer for display data and high resolution, high colordepth modes, and since the display controller may use other portions of the unused frame buffer for storage, the amount of memory used by the video map(s) is undesirable. Second, the video map puts even greater demands on the frame buffer, which is accessed by a number of subsystems within a display controller. Third, since the user can manipulate objects, including video windows, on the screen, any movement of a screen object can result in updating a significant number of memory locations within the video map 18.

Therefore, a need has arisen for a more efficient method and apparatus for displaying a clipped video window.

SUMMARY OF THE INVENTION

The display controller of the present invention has capability to display a predefined region of video on a computer display. A first memory stores information to be displayed. A second memory stores transition information defining points of the predefined region at which screen objects overlie the predetermined video region. Video control circuitry reads the transition information from the second memory and enables or disables writing of video information to the first memory responsive thereto. In the preferred embodiment, the first memory and second memory comprise portions of a frame buffer memory.

The present invention provides significant advantages over the prior art. First, since the stored data defines only the transition points, the amount of memory needed to store the transition information is significantly less than the memory needed for a video map. Second, accesses to the frame buffer are significantly reduced. Third, the information may be rapidly changed in response to movement of objects on the screen.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–6 of the drawings, like numerals being used for like and corresponding parts of the various drawings.

Figure 1A:
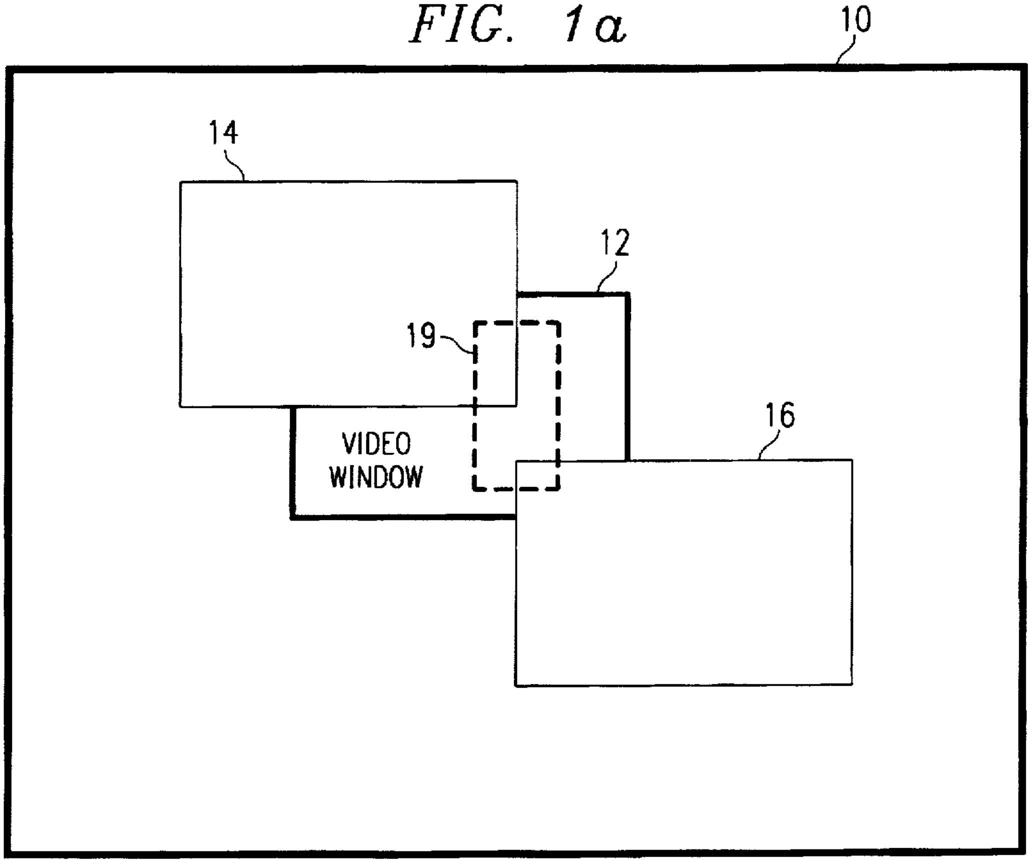
FIG. 1*a* illustrates a screen display showing a clipped video window.
Figure 1B:
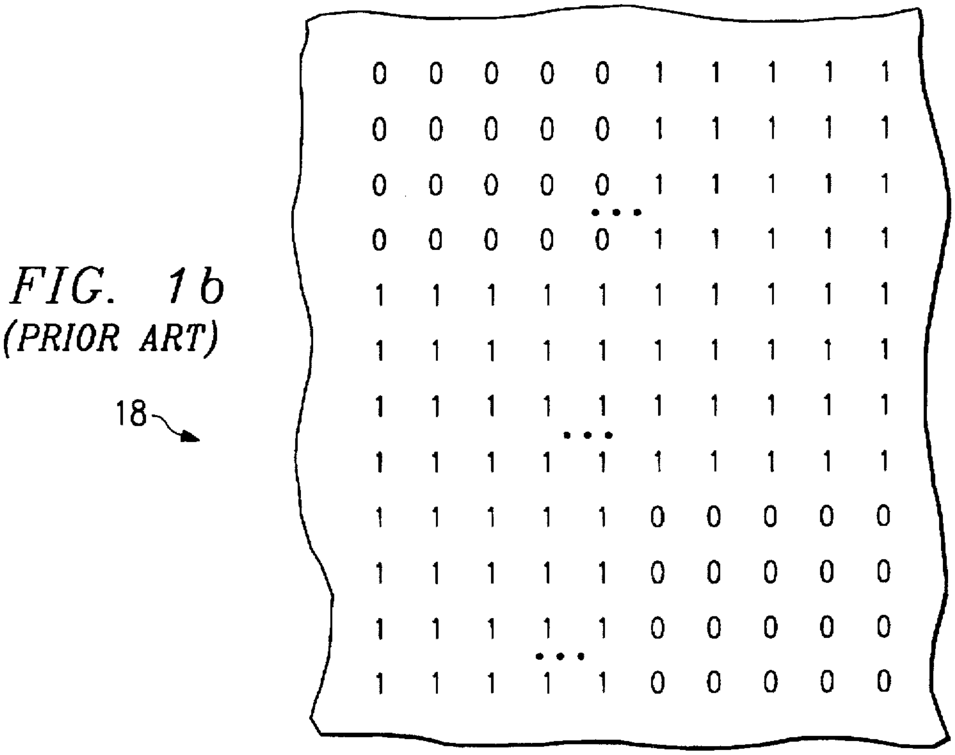
FIG. 1b (PRIOR ART)
FIG. 1*b* illustrates a portion of a prior art video map used to define clipped and unclipped portions of a video display window.
Figure 2:
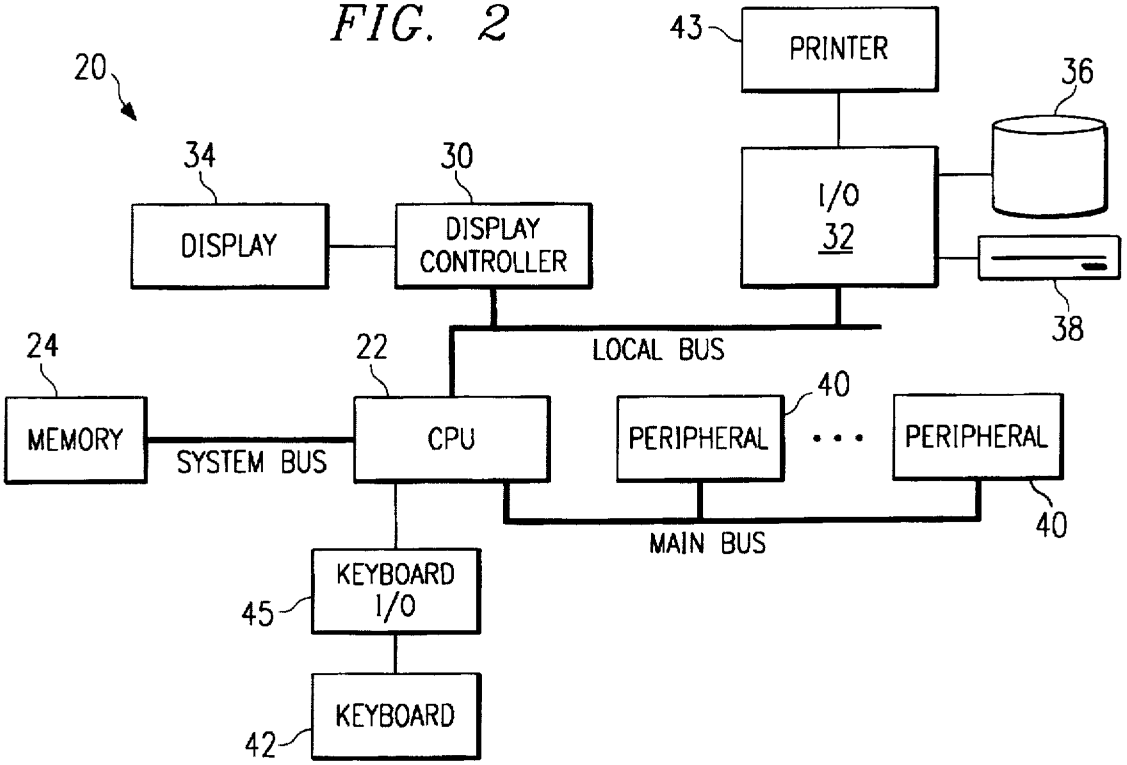
FIG. 2 illustrates a block diagram of a computer system incorporating the display controller of the present invention.

FIG. 2 illustrates a block diagram of a computer system 20. The computer system 20 includes a microprocessor (or central processing unit) 22, coupled to memory 24, a local bus 26 and a main peripheral bus 28. The display controller 30 and I/O circuitry 32 are coupled to a local bus 26. The display 34 (such as a CRT monitor or LCD flat panel) is coupled to the display controller 30. A hard disk 36 and floppy disk 38 are coupled to the I/O circuitry 32. A plurality of peripherals 40 may be coupled to the main bus. A keyboard 42 is coupled to the CPU 22 through keyboard interface 45. A printer 43 is also coupled to I/O circuitry 32. The computer system 20 of FIG. 2 is an exemplary embodiment for a high-performance computer system. Many computer systems vary from the architecture shown in FIG. 2 and the invention described herein would apply to various architectures. Further, the architecture shown in FIG. 2 is a basic architecture and many of the details have been removed for illustrative purposes.

Figure 3:
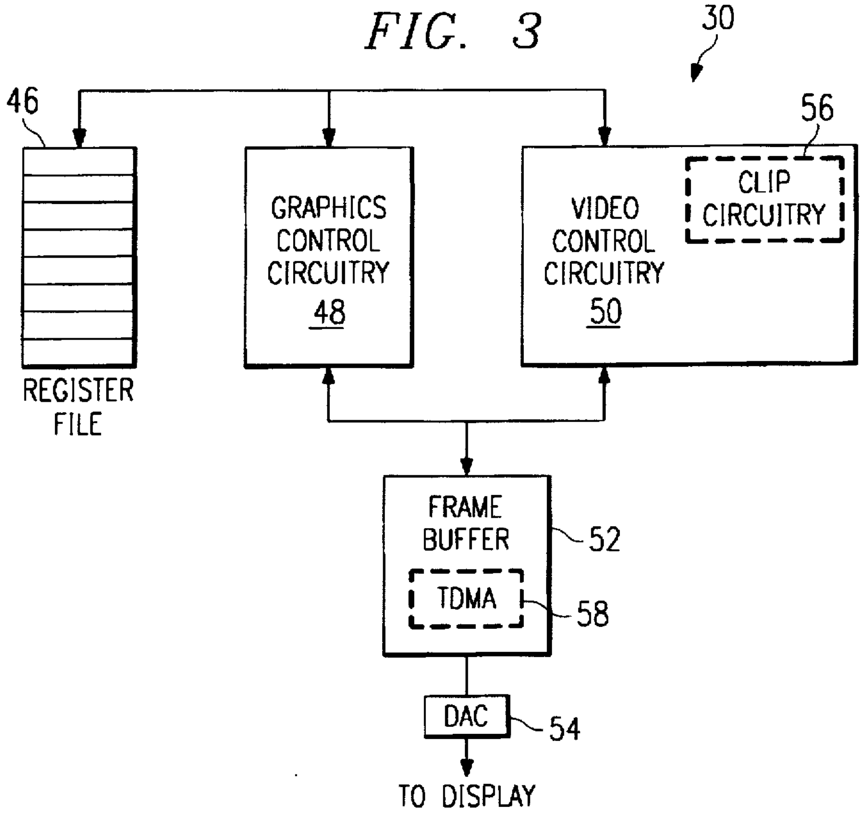
FIG. 3 illustrates a block diagram of the display controller of the present invention.

FIG. 3 illustrates a more detailed block diagram of the display controller 30. The display controller 30 includes a register file 46, graphics control circuitry 48 and video control circuitry 50. The graphics control circuitry 48 and video control circuitry 50 are coupled to a frame buffer 52. The frame buffer 52 has an output to a digital-to-analog converter (DAC) 54 which produces the output to the display 34. Video control circuitry 50 includes clip circuitry 56 for controlling which pixel of one or more video windows are written to the frame buffer 52, since portions of the video windows may be clipped. It should be noted that many of the details of the display controller are not shown for illustrative purposes.

In operation, the video control circuitry 50 and graphics control circuitry 48 write pixels to a frame buffer 52 in accordance with data from the microprocessor 22 and control information stored in the register file 46. Typically, register file 46 comprises a plurality of independently addressable register or other memory-types. The graphics control circuitry handles operations such as line drawing, block transfers (BLTs), and so on.

The video control circuitry 50 generates a video window on the display 34. The display controller 30 receives video through a VESA Media Channel (VMC) connector. Alternatively, the display controller 30 could be designed with integrated video circuitry for receiving video data directly, such as from a video cassette recorder or tuner.

Clip circuitry 56 determines whether a video pixel should be written to the frame buffer based on transition data stored in an unused portion 58 of the frame buffer 52. The transition data is generated by the driver for the display controller in conjunction with the operating environment of the computer. The driver is a software program which is executed by the CPU and acts as an interface between the computer's operating system and the display controller 30.

Figure 4:
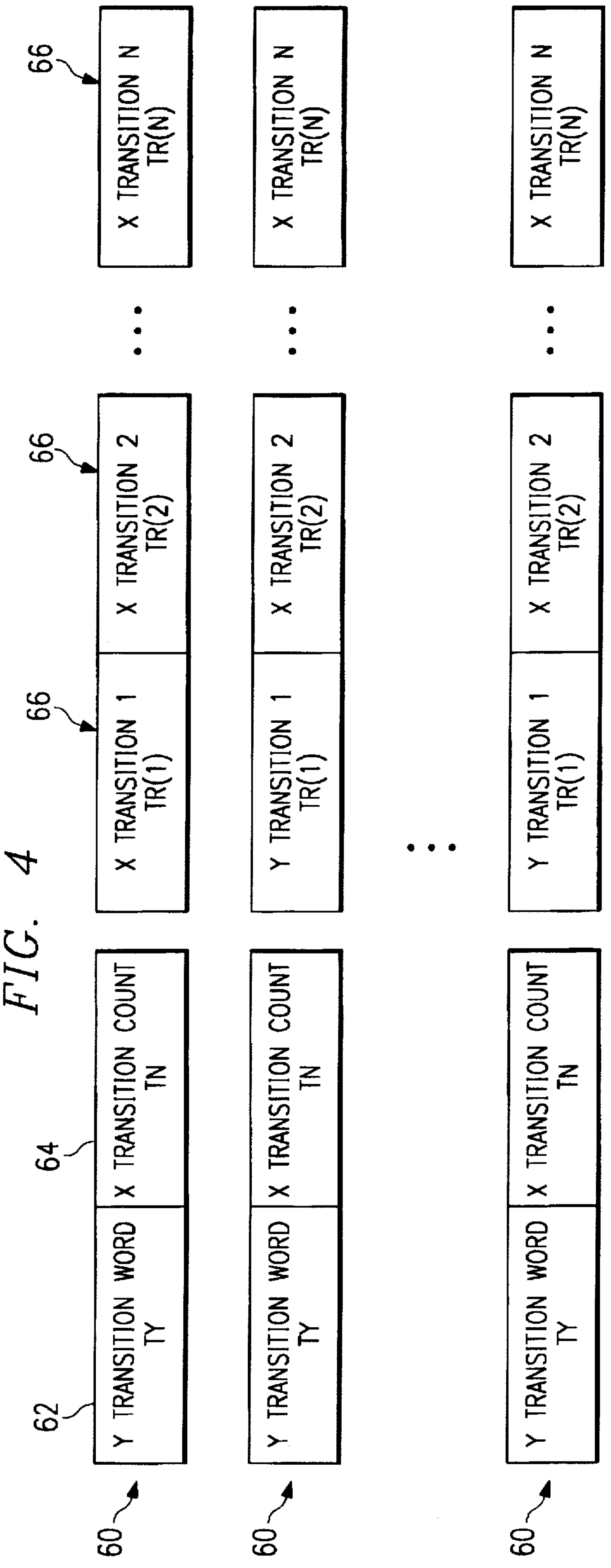
FIG. 4 illustrates a diagram of the data format used to describe clipped and unclipped regions of a video window.

FIG. 4 illustrates a preferred embodiment for the data format of the transition data stored in the transition data memory area 58. For purposes of illustration, it is assumed that the frame buffer 52 is addressable in double words (32 bits), although other data formats would be equally applicable. As shown in FIG. 4, the transition data for a video window comprises a plurality of video groups 60. Each video group has a Y Transition Word 62, an X transition count 64 and one or more X Transition Words 66. The number of X Transition Words 66 in a transition group 60 may vary between transition groups. In the preferred embodiment, each Y Transition Word is aligned on the Dword (double word) boundary. Accordingly, if the transition count 64 for a transition group 60 is odd, a word of dummy data is written following the Nth X Transition Word.

The Y Transition Word 62 signifies the scanline at which the remaining transition data in the associated transition group 60 is no longer valid. In the preferred embodiment, the Y Transition Word is a value expressed in world coordinates (i.e., relative to the top lefthand corner of the display).

The X transition count specifies the number of X Transition Words 66 which apply to the associated transition group 60. Each X Transition Word 66 in a transition group 60 signifies the X-coordinate, in world coordinates, of the pixel at which the clipping status will toggle (i.e., from disabled to enabled or from enabled to disabled). X Transition Word 1 always signifies the first pixel coordinate at which the video stream is enabled for the current scan line.

In the illustrated embodiment, each of the Y Transition Words 62, X transition count 64, and X Transition Words 66 are 16-bit values; hence, each can range from 0 to 65,535. These values are larger than needed for practical situations. It would be possible, therefore, to arrange the memory differently for more efficient use. However, as will be shown hereinbelow, because the technique described herein is so efficient, the memory usage is minimal.

FIGS. *5a–d* illustrate exemplary screen displays for which the associated transition data is described hereinbelow. In FIG. *5a*, a video window 70 is partially obscured by a single clipped region 72. The video window 70 comprises a screen area from (180, 120) to (399, 359). The clipped region 72 has a left-most boundary at X=330 and a top-most boundary at Y=290. The right-most boundary and the bottom-most boundary are outside of the video window 70. The transition information to describe the unclipped portion of the video window is:

First transition group: [290][1][180][X]

Second transition group: [360][2][180][330]

The Y Transition Word of the first transition group signifies that the information in that transition group is valid until scanline 290 at which point the next transition group should be used. The X transition count of "1" indicates that there is a single unclipped region starting at X coordinate 180. Since the first transition group has an odd number of X Transition Words, a dummy word is placed in the second word of the Dword containing the X Transition Word, such that the Y Transition Word of the second transition group begins at the start of a Dword address.

At scanline 290, the second transition group is used, indicating that the writing of the video data to the frame buffer is enabled starting at X=180 and is disabled at X=330.

FIG. *5b* illustrates a screen display wherein a video window 70, having the same coordinates as that shown in FIG. *5a*, is obscured by two clipped regions, a first region 72, having the same coordinates as those shown in FIG. *5a*, and a second clipped region 74, having a bottom-most edge at Y=194 and a right-most edge at X=304, with the left-most edge in top-most edge outside of the video window 70. In this instance, the transition information is:

First transition group: [195][1][305][X]

Second transition group: [290][1][180][X]

Third transition group: [360][2][180][330]

In the example shown in FIG. *5b*, the first transition group 60 indicates that the first set of transition data is valid until a 195th scanline. The first transition group defines a single non-clipped region which starts at X-coordinate 305. The "X" is a dummy word to complete the double word storing the first X Transition Word. The second transition group describes the unclipped area of the video window between scanline 195 and scanline 289. Within this area, the video window 70 is unclipped; therefore, there is a single transition starting at the left-most edge of the video window (X=180). At scanline 290, and continuing to the bottom edge of the video window at Y=360, there are two X Transition Words. The first X Transition Word enables printing to the frame buffer starting at X=180 and a second X Transition Word disables printing to the frame buffer at X=330.

FIG. *5c* illustrates a third screen display wherein an additional clipped region 76 is added to the screen information. The clipped region 76 has a left-most border at X=278 and a bottom-most border at Y=292. The top-most and right-most borders are outside of the video window.

Figure 5A:
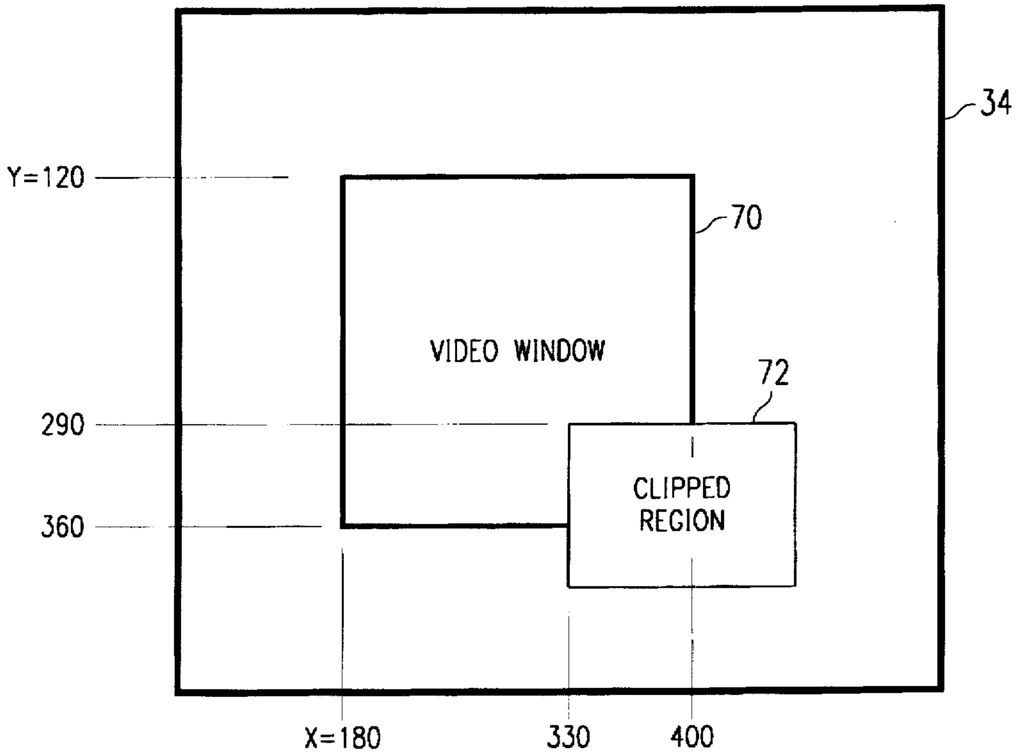
FIGS. 5*a*–5*d* illustrate screen displays showing various clipping situations.
Figure 5B:
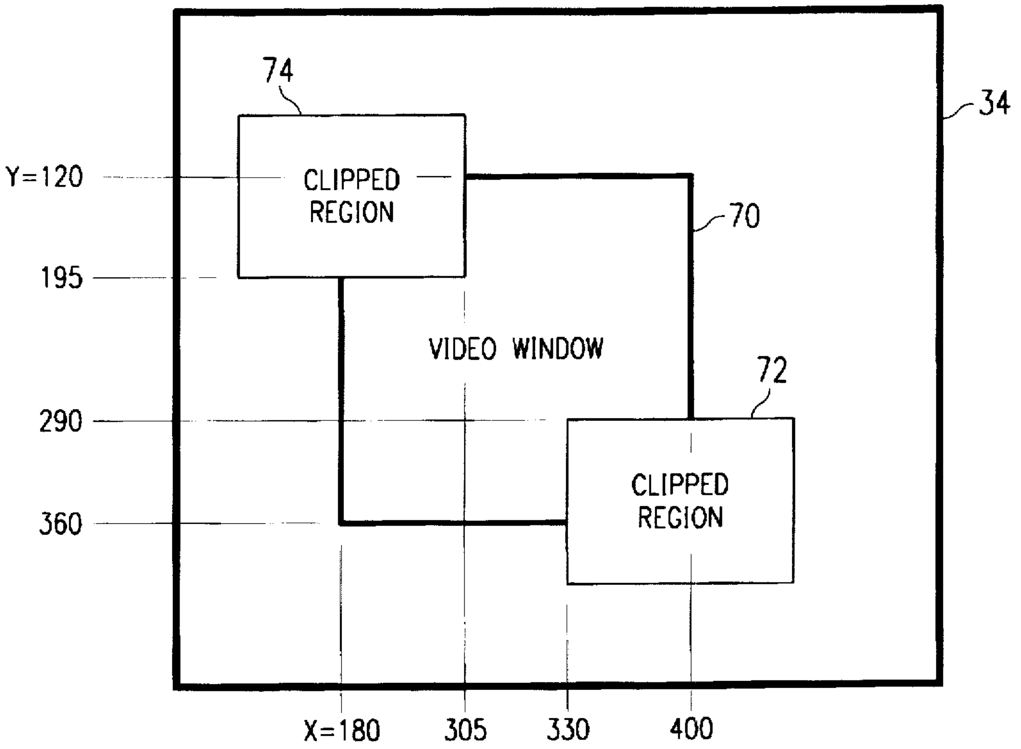
Figure 5C:
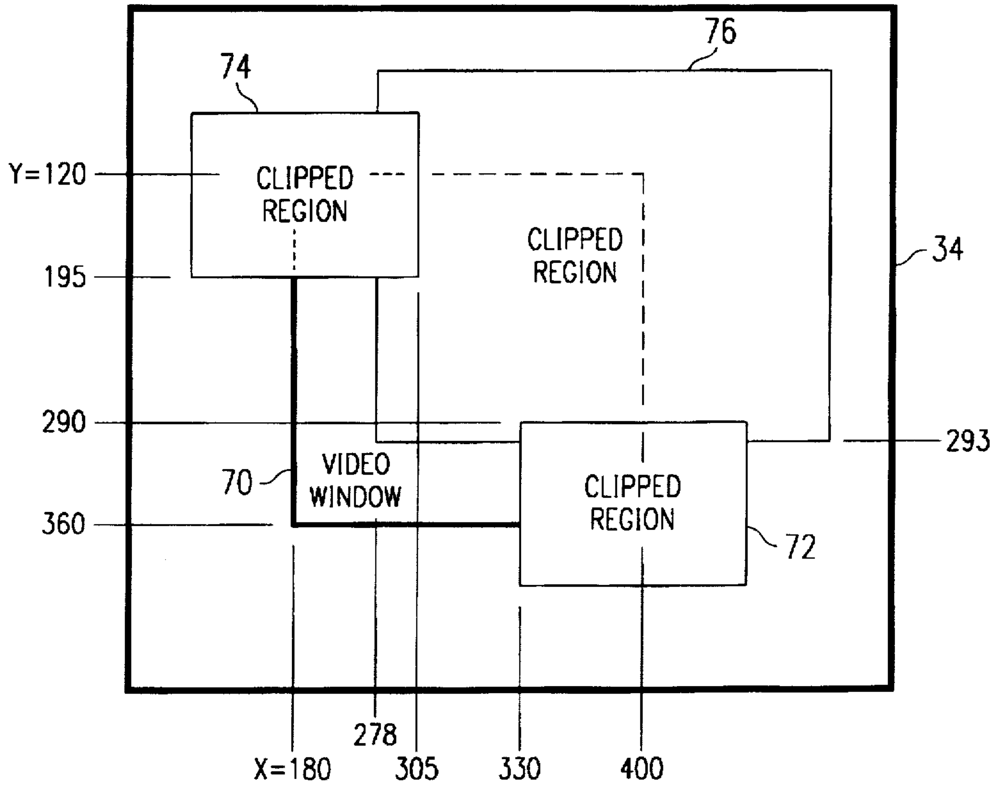

The transition information for FIG. 5c is:

First transition group: [195][1][400][X]

Second transition group: [293][2][180][278]

Third transition group: [360][2][180][330]

In this example, the video window 70 is completely obscured until scanline 195. Hence, the single transition shown in the first transition group starts at X=400, outside of the video window. Consequently, no video information for video window 70 is written until scanline 195. In the second transition group, for the portion of the video window between scanline 195 and 292, the first X Transition Word enables writing to the frame buffer at X=180 and the second X Transition Word disables writing to the frame buffer at X=278. The third transition group defines the visible area of the video window 70 between scanlines 293 and continuing to the bottom edge of the video window 70. The third transition group defines a first transition at X=180 to enable printing to the frame buffer and a second transition at X=330 to disable printing to the frame buffer at the left-most edge of clipped region 72.

Figure 5D:
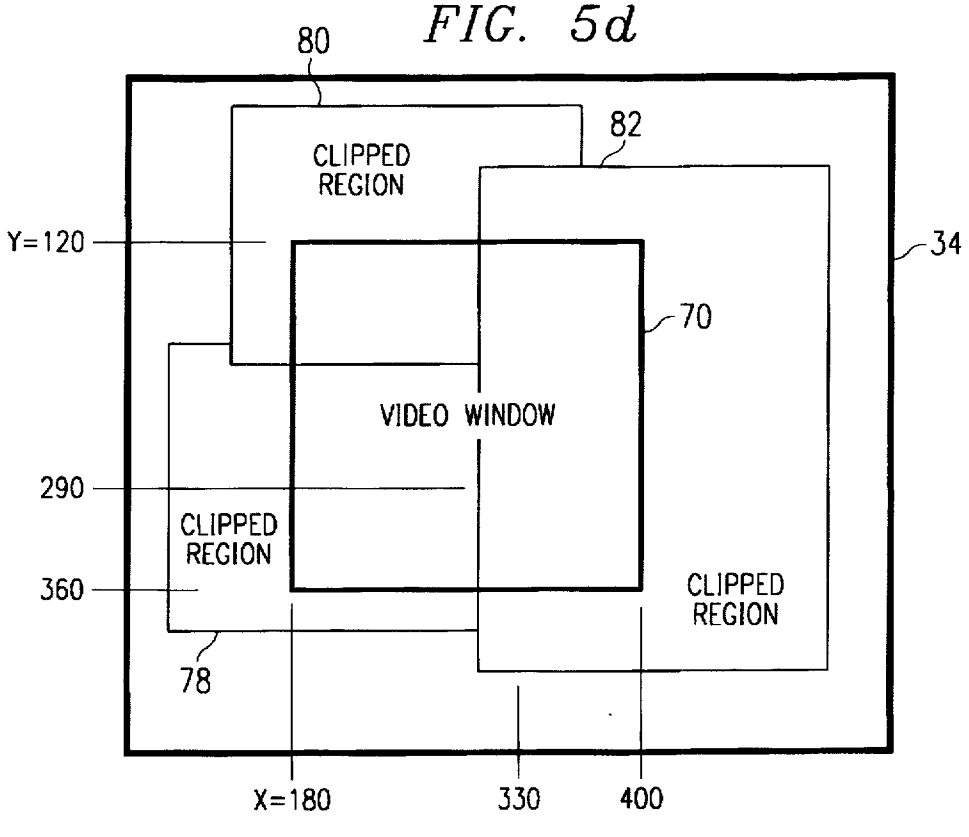

FIG. 5d illustrates a screen display wherein the video window 70 is completely obscured by clipped regions 78, 80 and 82. In this instance, the transition information comprises a single transition group:

Transition group: [65535][1][65535][x]

A Y Transition Word consisting of all "1"s (FFFFh), followed by a single X Transition Word of FFFFh signifies that the current video window is completely clipped or not visible. If the same video window were completely visible, the transition data would be:

Transition group: [360][1][180][X]

This transition group indicates that for the entire video window, writing to the frame buffer is enabled at the left-most edge of the video window 70.

Figure 6:
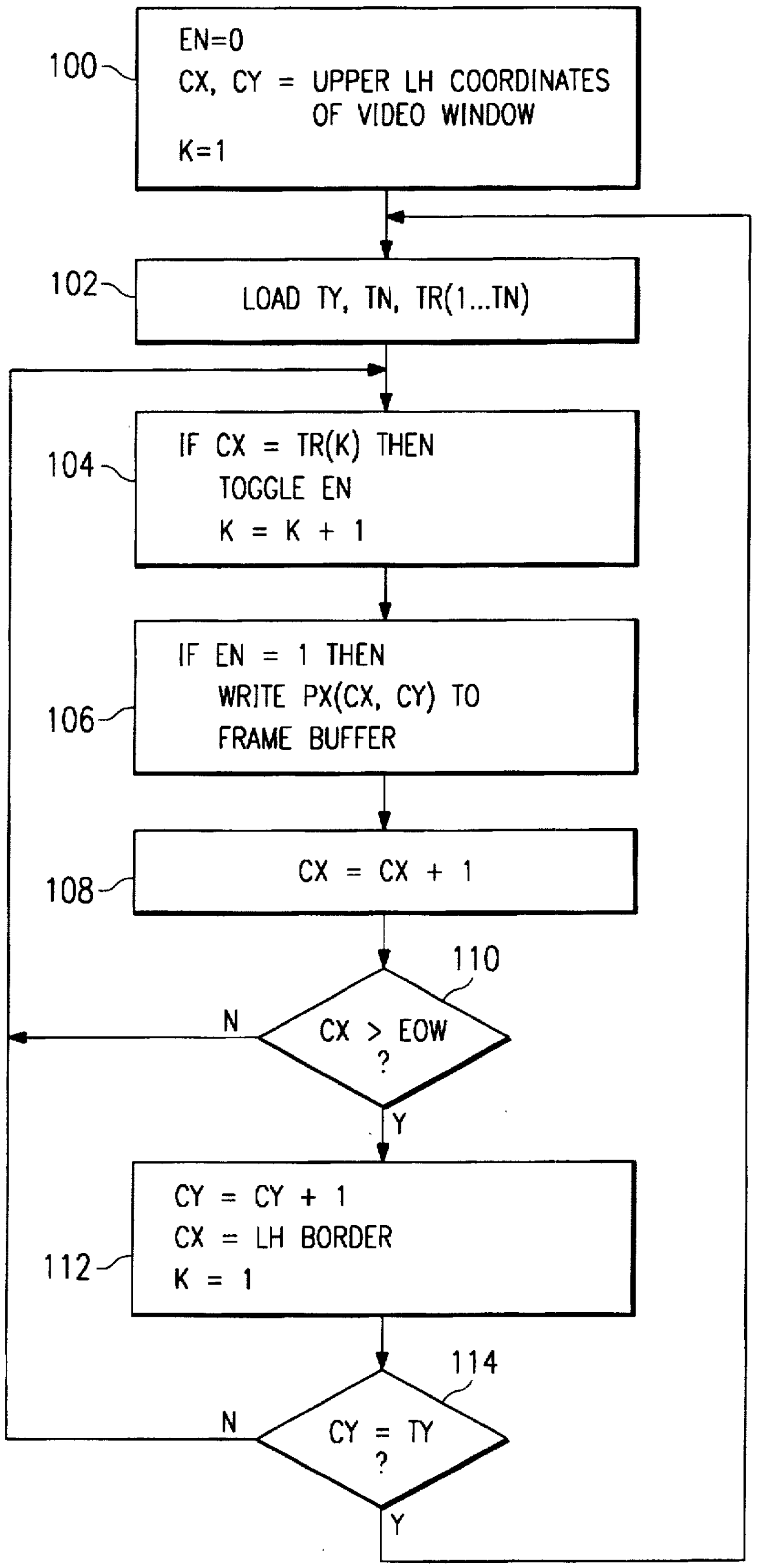
FIG. 6 illustrates a flow chart describing operation of the clipping circuitry of the graphic controller of FIG. 3.

The flow chart of FIG. 6 describes the operation of the clip circuitry 56 of the video control circuitry 50. In block 100, variables EN, CX, CY and K are initialized. EN defines whether writing is currently enabled to the frame buffer ("0" indicating that writing is disabled), CX and CY are set to the upper left coordinates of the video window and K is a counter which keeps track of the current X transition index. In block 102, TY (the Y Transition Word for the current transition group), TN (the transition count for the current transition group) and TR (1 . . . TN) (the X Transition Words for the current transition group) are loaded by the clip circuitry 56.

The clip circuitry 56 determines the starting address in the frame buffer for the first transition group by reference to data stored in the register file 46; thereafter, the clip circuitry 56 keeps track of the start of each transition group internally. The length of each transition group is defined by the transition count. While block 102 indicates that all X Transition Words are loaded simultaneously, they may be loaded individually or in pair corresponding to the Dwords, as needed.

Blocks 104–110 describe the decision process for writing video information for the video window to the frame buffer 52 for a single scanline. Initially, CX is set to the X-coordinate of the left edge of the video window. In block 104, if CX=TR(K) (i.e., if the current X-location on the scanline is equal to a transition point), then EN is toggled (changed from a "0" to "1", or from a "1" to a "0") and the pointer K is incremented to point to the next X Transition Word. In block 106, if EN=1, then the current pixel information PX(CX,CY) is written to the frame buffer, otherwise, no writing occurs.

In block 108, CX is incremented to point to the next X-location on the scanline. If CX has not passed the right-most edge of the video window (EOW), then the steps represented in blocks 104–108 are repeated. If the end-of-window is reached in decision block 110, then CY is incremented in block 112 to start the next scanline. In block 112, CX is reset to the X-coordinate of the left border of the video window and K is reset to point to the first X Transition Word. In decision block 114, if CY equals TY, the next transition group is loaded in block 102.

It should be noted that FIG. 6 describes the basic operation of the clipped circuitry 56, and efficiencies could be had by providing additional detail. For example, trivial situations, such as when the video window is completely obscured or totally unclipped, could be detected for more efficient processing. Also, when the transition information changes for a video window, the flow of FIG. 6 must be interrupted and pointers reset to accommodate the new information.

Also, it should be noted that while the present invention has been described in connection with a single window, multiple windows can easily be supported by providing separate transition information for each video window. In the preferred embodiment, at least two video windows are supported.

While the present invention has been described in connection with rectangular windows, it could also be used to control the writing of video confined by non-rectangular boundaries and/or video overlapped by non-rectangular screen objects, albeit with reduced efficiency.

The present invention provides significant advantages over the prior art. First, the memory requirements are significantly reduced as shown by example herein. Second, the number of accesses to the frame buffer are similarly reduced. Upon a change in the organization of the screen, the transition information can be quickly updated since very few memory locations will be affected, relatively to the video maps of the prior art.

Although the present invention and its advantages have been described in detail, it should be understood that various changes, substitutions and alterations can be made herein without departing from the spirit and scope of the invention as defined by the appended claims.

What is claimed is:

1. A display controller having capability to display a predefined region of video on a computer display, comprising:

a first memory portion in a frame buffer memory for storing information for display;

a second memory portion in a frame buffer memory for storing at least one group of transition information defining points of said predefined video region at which screen objects overlay said predefined video region, and wherein said group of transition information includes a first transition word for specifying a scanline at which the transition information in said group of transition information is no longer valid; and video control circuitry for reading said transition information from said second memory portion and enabling or disabling writing of video information to said first memory portion responsive thereto.

2. The display controller of claim 1 wherein said group of transition information further includes one or more second transition words for specifying one or more points along a scanline where a transition occurs between enabling and disabling writing of video information for said predefined video region to said first memory portion.

3. The display controller of claim 2 wherein said group of transition information further includes a transition count value for specifying the number of second transition words specified in said group of transition information.

4. The display controller of claim 2 wherein said second transition word is a predetermined code specifying that said screen objects completely overlay said predefined video region.

5. The display controller of claim 2 wherein said first transition word is a Y coordinate in world coordinates and said second transition word is an X coordinate in world coordinates.

6. The display controller of claim 2 wherein said first transition word and said one or more second transition words are each doubleword values and said first transition word of each group of video information is aligned on a double word boundary.

7. The display controller of claim 6 wherein a word of dummy data is inserted following an odd number of second transition words such that said first transition word of a next group of transition information is aligned on a double word boundary.

8. The display controller of claim 1 wherein said at least one group of transition information defining points of said predefined video region at which screen objects overlay said predefined video region comprises a first set of transition information and further including a second set of transition information comprising at least one group of transition information for defining points of a second predefined video region at which screen objects overlay said second predefined video region.

9. A computer system comprising:

a processor;

a main memory coupled to said processor;

a computer display; and a display controller coupled to said processor and to said computer display for displaying a predefined region of video on said computer display, comprising:

a first memory portion in a frame buffer memory for storing information for display on said computer display;

a second memory portion in a frame buffer memory for storing at least one group of transition information defining points of said predefined video region at which screen objects overlay said predefined video region, and wherein said group of transition information includes a first transition word for specifying a scanline at which the transition information in said group of transition information is no longer valid; and video control circuitry for reading said transition information from said second memory portion and enabling or disabling writing of video information to said first memory portion responsive thereto.

10. The computer system of claim 9 wherein said group of transition information further includes one or more second transition words for specifying one or more points along a scanline where a transition occurs between enabling and disabling writing of video information to said first memory portion.

11. The computer system of claim 10 wherein said group of transition information further includes a transition count value for specifying the number of second transition words specified in said group of transition information.

12. The computer system of claim 10 wherein said second transition word is a predetermined code specifying that said screen objects completely overlay said predefined video region.

13. A method of displaying a predefined video region on a computer display, comprising:

storing video information for display in a first portion of a frame buffer memory;

storing at least one video group of transition data for defining points of said predefined video region at which screen objects overlay said predefined video region in a second portion of said frame buffer memory, wherein said step of storing a video group of transition data comprises the step of storing a first transition word for signifying a scanline at which said video group of transition data is no longer valid; and reading said video group of transition data from said second portion of said frame buffer memory and enabling or disabling writing of video information for said predefined video region to said first portion of said frame buffer memory responsive thereto.

14. The method of claim 13 wherein said step of storing a video group of transition data further comprises the step of storing one or more second transition words wherein each second transition word specifies a point along a range of scanlines where a transition occurs between enabling and disabling writing of video information for said predefined region to said first portion of said frame buffer memory.

15. The method of claim 14 wherein said step of storing a video group of transition data further comprises the step of storing a transition count wherein each transition count specifies a number of said second transition words.

16. The method of claim 13 wherein said step of storing a video group of transition data further comprises the step of storing a predetermined code which specifies that said screen objects completely overlay said predefined video region.

17. The display controller of claim 2 wherein a first of said one or more second transition words specifies a first point along a scanline where writing of video information for said predefined video region to said first memory portion is enabled.

* * * * *